Dec. 21, 1965  A. DE FEO ETAL  3,224,194

GAS TURBINE ENGINE

Filed June 26, 1963  5 Sheets-Sheet 1

INVENTORS
ANGELO DE FEO
FERDINAND P. SOLLINGER
BY
Raymond P. Wallace

AGENT

INVENTORS
ANGELO DE FEO
FERDINAND P. SOLLINGER
BY
Raymond P. Wallace
AGENT

Dec. 21, 1965  A. DE FEO ETAL  3,224,194
GAS TURBINE ENGINE
Filed June 26, 1963  5 Sheets-Sheet 3
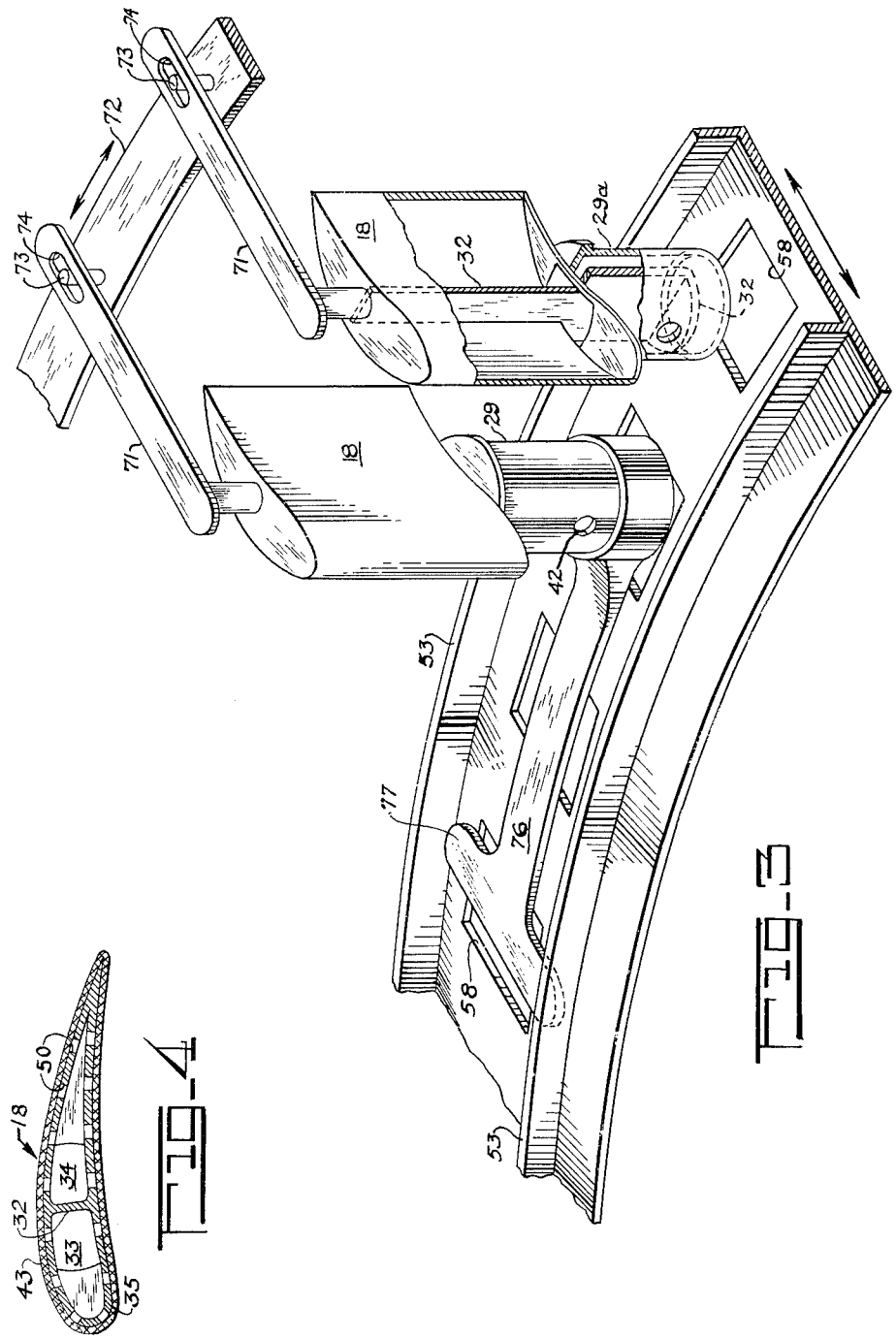
INVENTORS
ANGELO DE FEO
FERDINAND P. SOLLINGER
BY
Raymond P. Wallace
AGENT Dec. 21, 1965    A. DE FEO ETAL    3,224,194
GAS TURBINE ENGINE
Filed June 26, 1963    5 Sheets-Sheet 4
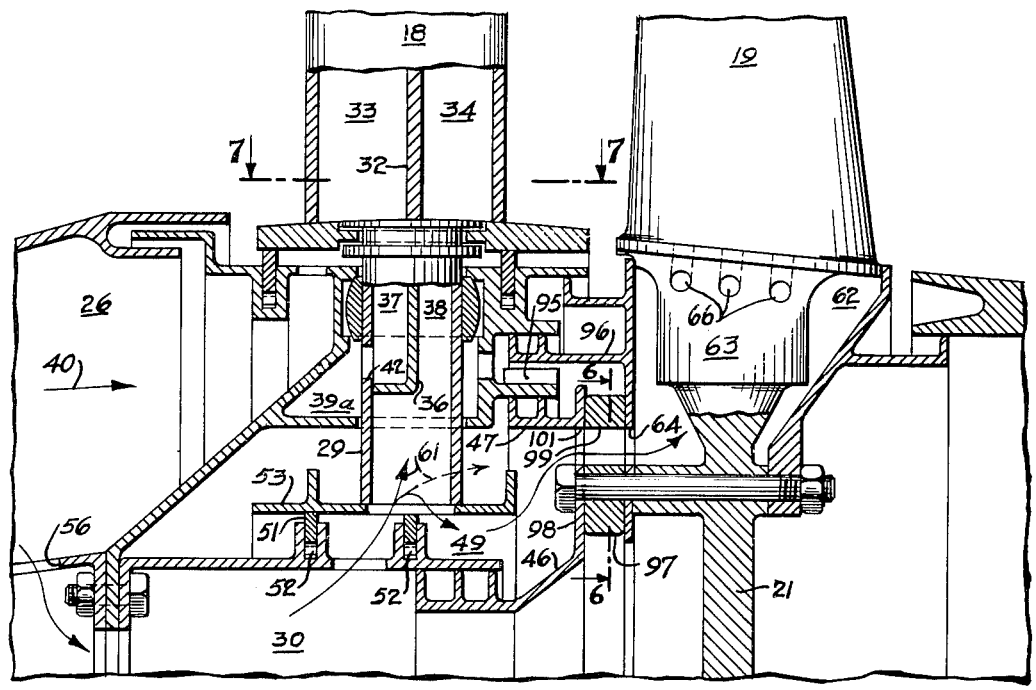
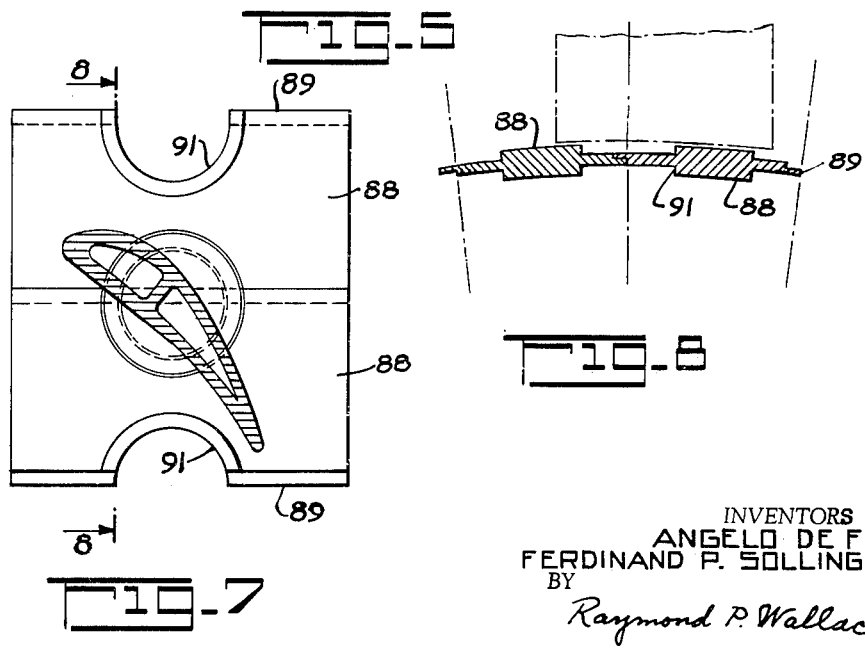
Fig-5
Fig-8
Fig-7
INVENTORS
ANGELO DE FEO
FERDINAND P. SOLLINGER
BY
Raymond P. Wallace
AGENT Dec. 21, 1965  A. DE FEO ETAL  3,224,194
GAS TURBINE ENGINE Filed June 26, 1963  5 Sheets-Sheet 5

INVENTORS
ANGELO DE FEO
FERDINAND P. SOLLINGER
BY
Raymond P. Wallace

AGENT

United States Patent Office 3,224,194
Patented Dec. 21, 1965

3,224,194
GAS TURBINE ENGINE
Angelo De Feo, Totowa Boro, and Ferdinand P. Sollinger, Wayne, N.J., assignors to Curtiss-Wright Corporation, a corporation of Delaware
Filed June 26, 1963, Ser. No. 290,718
20 Claims. (Cl. 60—35.6)

This invention relates to gas turbine engines, and is particularly directed to improvements in the turbine portion of the engine.

It is known in turbine engines to provide adjustability in the stator or nozzle blades which direct the flow of gases to the blades of the turbine rotor, in such a manner that the cross-section of the area of the flow paths between the blades may be varied for different operating conditions of the engine. Such adjustability has been accomplished by providing means for rotating the stator blades on radial axes to alter the dimensions of the nozzles therebetween. Such stator blades are usually provided with inner and outer shroud rings, and the ends of the blades may be in close contact with the shrouds at some optimum angle. However, as the nozzles are opened or closed the gap between the ends of the blades and the adjacent cylindrical surfaces of the shroud rings widens, with consequent leakage of gas at the ends of the blades and reduction of the efficiency of the nozzles. The present invention overcomes this defect by providing spherical surfaces on both shroud rings, with mating spherical surfaces on the blade ends, so that no gap is produced as the blade rotates.

The structures positioning the mountings of adjustable blades are subject to differential expansion in a direction parallel to the engine axis, so that in engines of the prior art the blade mountings are liable to drift from the design position, altering the radial axes of the blades, producing strains therein, and in some cases rendering the adjusting mechanism inoperable. The present invention provides mountings having a circular cross-section turnable in a socket, so that minor alterations in the angle of the blade axes can take place without strain or binding the mechanism.

It is further known in the prior art to provide for cooling air flow through the turbine stator and rotor blades. However, such cooling air must be bled off from the compressor delivery, resulting in reduced efficiency of the engine. It is therefore desirable to provide such cooling of nozzle and turbine blades only where needed, and in varying amount according to the heat generated by the combustion gases, thereby maintaining efficiency of the engine with minimum consumption of fuel. The present invention provides means for continuous cooling of the leading edges of the nozzle blades, with variable amount of cooling air to the trailing edges of the nozzle blades and to the turbine blades as the nozzles are opened or closed.

It is therefore a primary object of this invention to provide a gas turbine engine with improved efficiency.

It is another object to provide an engine having a turbine nozzle structure which reduces gas leakage.

A further object of the invention is to provide variable cooling means for the turbine portion of a gas turbine engine.

Yet another object is to provide improved mounting means for the nozzle blades of a gas turbine engine.

A still further object is to provide means for minimizing the effect of heat distortion in the turbine portion of a gas turbine engine.

An additional object of the present invention is to provide improved shroud rings for the turbine nozzle stator blades.

Another object is to provide a gas turbine engine having control means for automatically varying the amount of cooling air to the turbine nozzle and turbine rotor blades with variation in the area of the nozzle cross-section.

The foregoing objects and others ancillary thereto will be readily understood on reading the following specification in connection with the accompanying drawings, in which FIGURE 1 is a diagrammatic view of a gas turbine engine embodying the invention;

FIGURE 3 is a schematic view of a means for adjusting the angle of the nozzle vanes and for operating the associated cooling air valve;

FIGURE 4 is a section through one of the nozzle vanes, taken on line 4—4 of FIGURE 2;

FIGURE 5 is a view similar to FIGURE 2, of a modified embodiment;

FIGURE 7 is a plan view of a pair of the interlocking segments of the inner shroud of the nozzle vanes, with a vane mounted thereon; and FIGURE 8 is a section taken on line 8—8 of FIGURE 7.

Figure 1:
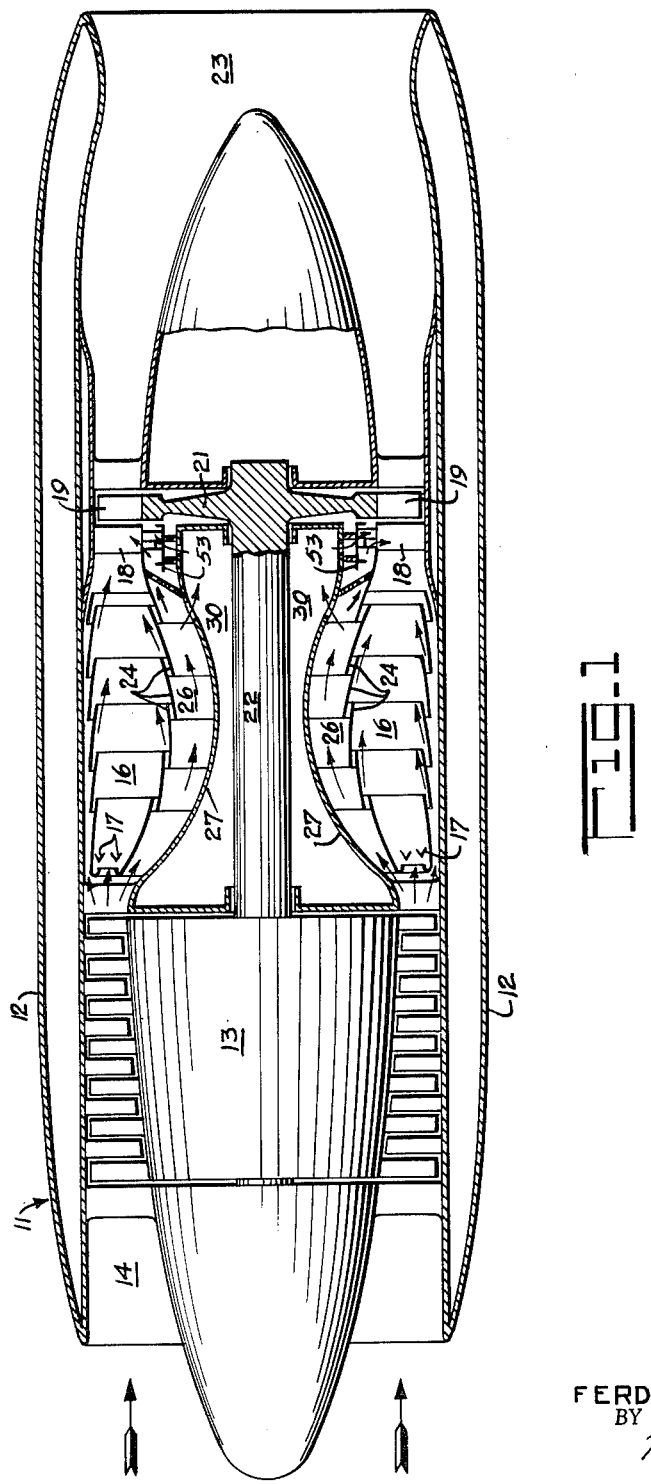

Referring more particularly to FIGURE 1, a gas turbine engine is schematically illustrated at 11 as comprising a ductlike housing 12 having an air compressor 13 journaled within said housing adjacent to its forward end. The air compressor 13 receives air through an annular air inlet 14 and delivers compressed air to a combustion chamber 16. Within the combustion chamber 16 air is burned with fuel supplied, for example, through fuel nozzles 17, and the resulting combustion gases are directed by a nozzle blade or guide vane structure 18 to the rotor blades 19 of a turbine rotor 21 for driving said rotor. A shaft 22 drivably connects the turbine rotor 21 with the air compressor 13. From the turbine blades 19 the exhaust gases discharge rearwardly into the surrounding atmosphere through an exhaust nozzle 23, whereby the gas turbine engine is provided with forward propulsive thrust.

In order to cool the turbine nozzle vanes 18 and the turbine rotor blades 19 air is bled off from the compressor delivery and supplied through appropriate channeling structure to the interior of the nozzle blades and the rotor blades. Although such channeling structure is schematically shown in FIGURE 1, it is to be found in more detail in FIGURE 2. The generally annular combustion chamber 16 is defined by a plurality of serially disposed annular wall members 24 forming the walls of said chamber, said wall members having their adjacent ends overlapping in a telescopic manner with the said ends being of different diameters to admit air into the combustion chamber from an air duct 26 surrounding said chamber, the duct being defined by the outer housing of the engine and by a generally annular liner 27 radially inward of the combustion chamber, which liner 27 also defines a central chamber 30 surrounding the drive shaft. Such a combustion chamber structure and surrounding duct is broadly known in the prior art, and is similar in a general way to that shown in U.S. Patent No. 2,884,759.

Part of the output of the compressor is delivered directly to the combustion chamber 16. However, owing to the relatively small entrance aperture of the combustion chamber, and the partial occlusion thereof by the fuel nozzles or burners 17, there is a definite pressure drop in the combustion chamber. The surrounding duct 26 comprises a diffuser section which recovers substantially full pressure from the compressor, and therefore the air pressure in the duct will be greater than the gas pressure in the combustion chamber. The telescopic construction of the combustion chamber allows some of the duct air to bleed back into the combustion zone down stream from the fuel nozzles, whereupon such air mingles with the combustion products which are directed by the nozzle vanes to the turbine blades. The remainder of the duct air is available for cooling of the nozzle blades and turbine blades, being fed to the interior passages thereof through the base and allowed to escape through porous surfaces of the blades. The leading and trailing edges of the nozzle blades are differentially cooled according to the temperature conditions of the engine, the leading edge being cooled continuously during operation. The nozzle vanes are so constructed internally that cooling air can be channeled separately to the trailing edges, the amount of cooling air thus supplied being controlled as required by appropriate valve means.

Figure 2:
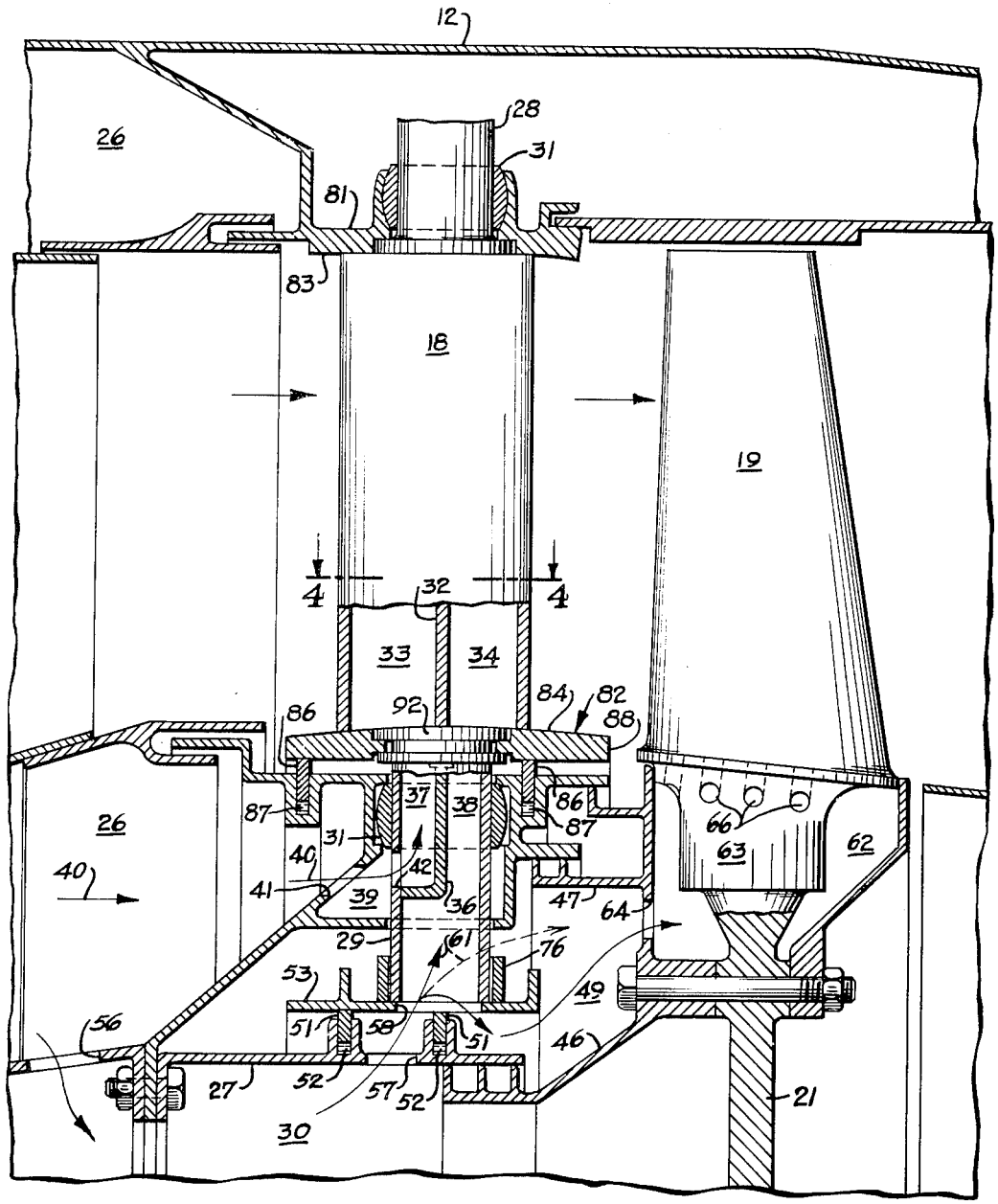
FIGURE 2 is an enlarged cross-sectional view in elevation of a portion of the turbine structure.

Referring now to FIGURE 2, circumferentially-spaced, radially-extending adjustable nozzle blades or guide vanes 18 are journaled on trunnions 28 and 29 (or 29a, FIGURE 3) and are rotatable about the trunnion axes extending substantially radially from the longitudinal axis of the engine, whereby the cross-section of the apertures for gas flow between nozzle blades may be altered in area, and the angle at which the gases are directed to the turbine blades may be regulated. The trunnions are journaled in ball joints 31 positioned by inner and outer shrouds hereinafter described. Such ball joint mounting allows minor variations in the angle of the radial axes of the vanes, caused by differential expansion of the parts of the liner and associated structure, with consequent drifting of the mounts.

The nozzle blades are hollow, and the radially inner trunnions 29 and 29a (FIGURE 3) are tubular and communicate with the interior of the blades. A septum 32 extends radially within each nozzle blade 18 transversely to the chord thereof, dividing the interior thereof into a leading edge chamber 33 and a trailing edge chamber 34. The interior of each tubular trunnion 29 and 29a is also divided by a septum 36, separating the interior of the trunnion into a passage 37 communicating with leading edge chamber 33, and a passage 38 communicating with trailing edge chamber 34.

Portions of the liner structure form a generally annular plenum chamber 39 surrounding the trunnions 29 and 29a adjacent to the ball joints and radially inward therefrom. Where the trunnions transpierce the inner annular wall of chamber 39, a moderate clearance may be provided between the wall and the trunnions, allowing some shifting of the trunnion axes, and a resilient sealing means (not shown) may be disposed therebetween. Plenum chamber 39 communicates with duct 26 by apertures 41 and with trunnion passages 37 by apertures 42 in the outer wall of each trunnion, whereby cooling air from duct 26 is continuously channeled during operation to leading edge chambers 33, as indicated by arrows 40. Since the air pressure in duct 26 is higher than the gas pressure of the combustion chamber at the leading edges of the nozzle vanes, the cooling air in chambers 33 bleeds through the porous skin 43 (FIGURE 4) of the vanes, producing continuous transpiration cooling of the leading edges.

Portions of the liner structure 27 and the labyrinth seal members 46 and 47 extending forwardly from the turbine rotor 21 define a generally annular plenum chamber 49 in the region of the radially inner ends of tubular trunnions 29 and 29a, the chamber 49 communicating with passages 38 of said trunnions. Liner 27 is provided with a pair of annular ways comprising piston ring grooves surrounding said liner within plenum chamber 49. A piston ring 51 is sealingly disposed within each of the grooves and is urged radially outwardly by resilient means such as springs 52 disposed in the grooves inwardly of the piston rings. An annular valve member 53 surrounds the piston rings in sealing relation therewith, the valve member having a channel cross-section of which the web portion forms the valve plate proper, with the flanges extending radially outwardly. Liner 27 is provided with a plurality of apertures 56 disposed upstream from the nozzle vane zone and communicating with central chamber 30, whereby chamber 30 is pressurized by flow of air from duct 26. Liner 27 is provided with a second plurality of apertures 57 disposed between the ways of the two piston rings and communicating with chamber 30. Valve member 53 is translatable in an axial direction across the piston rings; the web portion of the valve is provided with a plurality of apertures 58, whereby communication of variable area is provided between pressurized chamber 30 and plenum chamber 49 upon appropriate translational movement of the valve member. As shown in FIGURE 2, the valve is in partially open position. The fully open position is attained by axial movement of the valve member leftward, as shown, to a position where apertures 58 are substantially in register with the space between the piston rings. The fully closed position is reached by axial movement of the valve member rightward to a position where the apertures 58 have passed the sealing edge of the downstream piston ring. The web portion of the valve member is prolonged in the upstream direction beyond the upstream flange portion, in order to maintain sealing against the upstream piston ring when the valve is fully closed.

When the valve is open to any degree, communication is established between plenum chamber 49 and central chamber 30 and cooling air is supplied, as indicated by arrows 61, to plenum chamber 49 and then to trunnion passages 38, whence the cooling air passes to trailing edge chambers 34, passing then through the porous skin of nozzle blades 18 and providing transpiration cooling of the trailing edges of the nozzle blades. The amount of cooling air thus supplied to the trailing edges of the nozzle blades is controlled to vary directly with the cross-sectional area of the flow path of gases therebetween.

The turbine rotor 21 is provided with a generally annular circumferential plenum chamber 62 surrounding the roots 63 of turbine blades 19. The turbine plenum chamber is provided with a plurality of apertures 64 communicating with plenum chamber 49, and blade roots 63 are provided with apertures 66 communicating with the interiors of turbine blades 19. Thus when valve member 53 is open, some of the cooling air from chamber 49 passes through apertures 64 into rotor chamber 62 and thence through apertures 66 to provide transpiration cooling of the turbine blades through porous surfaces. It will be understood that the plenum chamber of the turbine rotor may be omitted when it is not desired to cool the turbine blades, and all the air of chamber 49 may be channeled to the nozzle vanes. Also, the trunnions of the nozzle blades may be occluded from chamber 49 and the nozzle blades cooled only by air from chamber 39, all the air from chamber 49 being channeled to the turbine blades.

FIGURE 4 shows a cross-section of a suitable hollow nozzle blade 18, transverse to the radial axis of the blade. There is shown a structural wall member 35 of airfoil outline defining a hollow blade. The interior of the blade is divided by a radially extending septum 32 into a leading edge chamber 33 and a trailing edge chamber 34. The wall member is surrounded by a porous skin 43 attached thereto, of metal transpiration fabric or other suitable permeable metal, such as is well known in the art. The wall member is provided with a plurality of apertures 50 therethrough to allow cooling air to pass from chambers 33 and 34 and thence through the permeable skin. Although the nozzle blade is here described as having a structural wall covered by a porous skin, it is to be understood that the entire structural portion of the blade may be made of permeable material, such as sintered metal, making it unnecessary to provide an outer skin. The turbine blades 19 may be made in a similar way, or in various known ways providing internal passage means for flow of a cooling medium.

FIGURE 3 shows schematically a means of varying the discharge angle of the nozzle blades and the area of the cross-section of the gas flow path therebetween, and simultaneously controlling valve member 53 to its fully open position at maximum area of flow path and to the fully closed position at minimum area of flow path, thereby providing maximum cooling air to the trailing edge chambers during maximum gas flow and decreasing such cooling air as gas flow decreases.

From the radially outer end of each nozzle blade 18 a lever 71 extends generally parallel to the engine axis in a downstream direction, the upstream ends of the levers being fixed to the blades. An annular band 72 extends circumferentially to the engine, within the outer housing 12 and external to the exhaust section. A plurality of pins 73 extend radially outwardly from the surface of band 72, equal in number to the number of nozzle blades. Each pin extends into a slotted aperture 74 in the downstream end of one of the levers 71. Band 72 is circumferentially translatable, and on circumferential movement of the band the pins actuate levers 71, rotating the blades on radial axes to vary their angles and the dimensions of the flow paths.

The majority of blades 18 have short radially inner trunnions 29a, which short trunnions extend inwardly to a distance sufficient to penetrate the radially inner wall of plenum chamber 39 to place the open inner ends of the trunnions in communication with chamber 49. However, at least two of blades 18, and preferably from three to five such blades equally spaced around the circumference, have longer inner trunnions 29 which extend inwardly to a point just sufficient to clear the web section of valve member 53. These long trunnions have affixed to each at their inner ends a valve control lever 76 having an elongated shank positioned between the webs of valve member 53 and curved congruently with the valve member. The free end of each lever 76 is provided with a cross-head 77 of suitable dimensions to contact the inner surfaces of the two webs. Therefore, when the blades 18 are rotated on their axes by movement of band 72 the levers will move the valve member in an axial direction to open or close valve apertures 58.

It is to be understood that the invention is not limited to the patricular means described for rotating blades 18 on their axes. For instance, such rotation could be achieved by providing each blade with a pinion engaged with a circumferentially translatable rack, or by other linkage arrangements well known in the art for this purpose.

As shown in FIGURE 2, the ball joints 31 in which the trunnions 28, 29, and 29a are journaled are borne and positioned by an outer shroud 81 and an inner shroud 82. The outer shroud ring 81 has a plurality of concave spherical surface areas 83 on the inner side thereof, there being one such spherical area for each blade. The outer end of each blade has a convex spherical contour of congruent curvature nested in the mating spherical area of the shroud. The inner shroud ring 82 is provided with an equal number of convex spherical areas 84, the inner ends of the blades having concave contours of congruent curvature mating with areas 84. By this means pivotal blade adjustment may be made with a minimum of clearance between the shroud rings and the adjacent blade ends, to prevent leakage of gases from the prescribed flow paths. The pivotal axes of the blades are positioned upstream from the centers of pressure on the blades, so that during operation of the engine there is always a load on the blades tending toward the fully open position.

A portion of the liner structure radially inward of shroud 82 is provided with a pair of annular circumferential ways comprising grooves for pressure rings. A pressure ring 86 is sealingly disposed in each of said grooves, there being one such ring toward the upstream edge of shroud 82 and one ring toward the downstream edge of the shroud. Each such pressure ring is urged radially outward by any convenient resilient means, such as springs 87 disposed in the grooves inwardly of the pressure rings. The pressure rings are in sealing contact with the inner surface of shroud ring 82, whereby gas leakage under the shroud is prevented.

Inner shroud 82 is formed of a plurality of interlocking circumferential segments, each of which is urged radially outwardly by the pressure rings to maintain tight contact of spherical zones 84 and the inner blade ends and spherical zones 83 with the outer blade ends, to prevent gas leakage. FIGURES 7 and 8 show a pair of such interlocking segments 88. All such segments are provided with mating lap joints at their circumferentially meeting edges 89, the line of juncture extending in the axial direction and at the interior surfaces of said segments intersecting the turning axis of the blade, being offset therefrom at the exterior surface. Each such segment has at each of its mating edges half of a circular bore 91, the bores being counterbored from both the inner and the outer sides, so that when two such segments are mated the half-bores come together to form a seat for a grooved hub 92 surrounding the trunnion at the inner end of each blade. The bores are produced on axes radial to the assembled shroud ring so that they provide flat turning seats for the hubs. The entire outer surface of the assembled shroud ring 82 may be made spherical from a center of curvature coincident with the longitudinal axis of the engine, or a portion of such a spherical surface may be produced at the mating edge of each segment, so that when the shroud is assembled there will be a spherical surface of sufficient area at the inner end of each nozzle blade.

Although the present embodiment is described as having only the inner shroud urged resiliently outward, it will be understood that the invention also contemplates embodiments wherein the outer shroud may be urged resiliently inward, or wherein both such shrouds are segmented and urged toward each other.

In a case wherein variations of some of the design parameters of the engine have been made, there may not be a sufficient pressure differential between the cooling air supplied by duct 26 and the gas pressure in the combustion chamber for continuous bleeding of cooling air through the leading edges of the nozzle vanes. In such a case there may be provided a booster pump for increasing the pressure of cooling air supplied through trunnion passages 37 to leading edge chambers 33 of the blades.

Such a modified embodiment is shown in FIGURE 5. This embodiment is generally similar to that of FIGURE 2, and the same part numerals are used except for the modified and additional elements. In the present embodiment the plenum chamber 39a surrounding trunnions 29 and 29a and communicating with trunnions passages 37 by apertures 42 has been extended in the downstream direction, and is defined in part on the downstream side by a portion of the turbine rotor and by the labyrinth seal members 47 and 96 extending therefrom. The turbine rotor 21 bears on the upstream side thereof a plurality of circumferentially-spaced blades 97 comprising a centrifugal air pump. The pump blades are occluded from plenum chamber 49 by a circular wall member 98, from which labyrinth seal members 46 and 47 extend. However, each pump blade 97 has an axially extending aperture 99 therethrough mating with apertures 64 in rotor plenum chamber 62, and wall member 98 is provided with a plurality of apertures 101 mating with apertures 99, whereby communication is established between plenum chamber 49 and rotor chamber 62 to provide cooling air to the turbine blades.

Chamber 39a has no direct communication with duct 26, as in the previous embodiment. Instead, pump blades 97 pump air centrifugally from central chamber 30 into plenum chamber 39a. Positioned within the entrance of plenum chamber 39a and receiving delivery from the centrifugal pump are diffuser vanes 95, which recover full pressure from the pump to maintain chamber 39a at a sufficiently high pressure to provide continuous cooling to the leading edges of the nozzle blades. In all other respects the operation of the embodiment of FIGURE 5 is the same as that shown in FIGURE 2.

Figure 6:
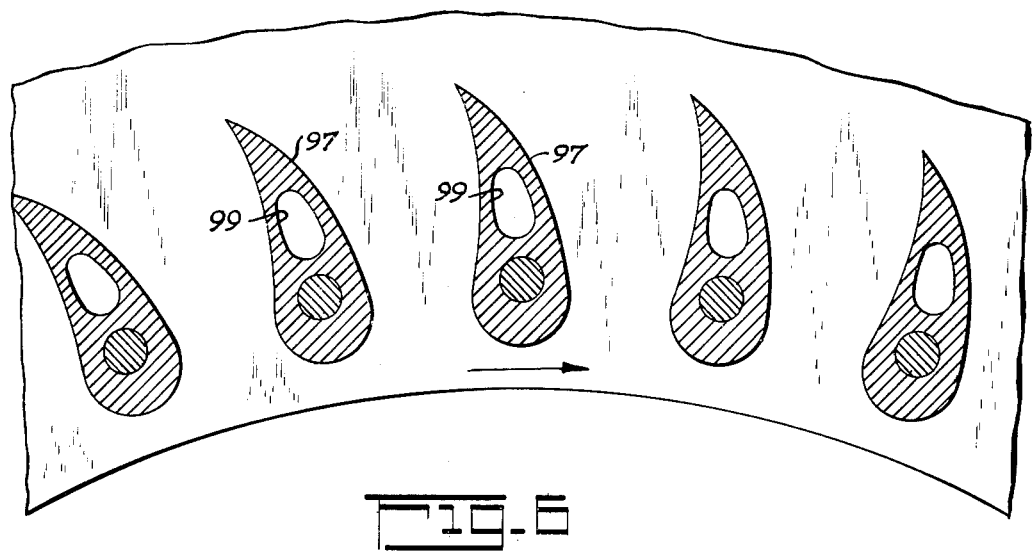
FIGURE 6 is an enlarged fragmentary cross-section taken on line 6—6 of FIGURE 5.

FIGURE 6 is an enlarged fragmentary cross-section taken on line 6—6 of FIGURE 5, showing the centrifugal pump blade 97 borne by the turbine rotor.

Although the invention has been described above in specific embodiments, it is understood that various modifications may be made by those skilled in the art without departing from the scope of the invention. It is intended to cover all such modifications in the appended claims.

What is claimed is:

1. In a gas turbine power plant, the combination of a turbine rotor having a set of circumferentially-spaced blades extending therefrom for co-action with the turbine motive fluid for driving said rotor, a turbine nozzle structure having a set of circumferentially spaced blades for directing turbine motive fluid to said rotor blades; means for adjusting said turbine nozzle structure for varying the effective cross-sectional area of the turbine motive fluid flow path between the blades of said nozzle structure, passage means for supplying a cooling medium to as least one of said sets of blades for flow therethrough to cool said blades and means responsive to adjustment of said nozzle structure in a direction increasing its said area for increasing said flow of cooling medium.

2. In a gas turbine power plant as claimed in claim 1 and in which said cooling medium is supplied to said set of turbine blades.

3. In a gas turbine power plant as claimed in claim 1 and in which cooling medium is supplied to said set of nozzle blades.

4. In a gas turbine power plant as claimed in claim 1 and in which said cooling medium is supplied to both said sets of blades.

5. In a gas turbine power plant as claimed in claim 1 and in which said responsive means includes valve means in said passage means and operatively connected to the nozzle structure such that said valve means is moved in an opening direction in response to an increase in said nozzle area.

6. In a gas turbine power plant as claimed in claim 1 and in which each of said nozzle blades has a hollow leading edge portion and a hollow trailing edge portion and said cooling medium supply passage means includes a first passage for supplying cooling medium to the hollow leading edge portions of said nozzle blades and a second passage portion for supplying cooling medium to the hollow trailing edge portions of said nozzle blades and further in which said responsive means is effective to vary the flow of cooling medium through said second passage.

7. In a gas turbine power plant as claimed in claim 6 and in which each of said nozzle blades has a mounting trunnion extending radially inward from the radially inner end of said blade, each of said trunnions being hollow and having the interior thereof divided into a first trunnion passage and a second trunnion passage, said first trunnion passage communicating with said hollow leading edge portion and said first cooling medium supply passage, and said second trunnion passage communicating with said hollow trailing edge portion and said second cooling medium supply passage.

8. In a gas turbine power plant as claimed in claim 7 and including means for increasing the pressure of the cooling medium supplied to the hollow leading edge portion of said nozzle blade relative to that supplied to their trailing edge portions.

9. In a gas turbine power plant as claimed in claim 1 and in which said nozzle blades are substantially radially disposed and said turbine nozzle adjusting means includes means for supporting each of its blades for pivotal adjustment about a substantially radial axis, said nozzle blade supporting means including a radially-extending shaft-like extension on the radially inner and outer ends of each nozzle blade, first and second supporting structures for the radially inner and outer ends respectively of said nozzle blades, each of said supporting structures including bearing means for each nozzle blade in which the blade shaft-like extensions are pivotally supported, and each of said bearing means including a circular element movable in its said supporting structure to permit changes in the direction of the axis of said blade.

10. In a gas turbine power plant comprising combustion apparatus, an air compressor for supplying compressed air to said apparatus for combustion with fuel, a turbine rotor drivably connected to said compressor and having a set of circumferentially-spaced turbine blades extending therefrom for co-action with combustion gases provided by said apparatus for driving said turbine rotor, the combination comprising a turbine nozzle structure including a set of circumferentially-spaced and generally radially-disposed blades for directing the combustion gases to said turbine blades, and means for supporting said nozzle blades for pivotal adjustment about individual substantially radial axes for varying the effective cross-sectional area of the flow path between said nozzle blades, said supporting means including a pair of radially-spaced inner and outer annular supporting walls between which said nozzle blades extend, each of said nozzle blades having a radially-extending shaft-like extension at its radially inner and outer ends and each of said supporting walls having individual bearing means for each of the nozzle blades within which the shaft-like extensions of said blades are pivotally supported, each of said bearing means including a circular element movable in said supporting wall to permit angular variations in the axis of said blade in the radial and upstream-downstream directions.

11. The combination recited in claim 10, in which said combustion apparatus is disposed between said inner and outer walls upstream from said nozzle blades and said walls are connected together upstream of said combustion apparatus, each of said nozzle blades having a hollow leading edge portion and a hollow trailing edge portion, and air passage means disposed between said compressor and said set of nozzle blades for supplying cooling air from said compressor to said nozzle blades, said air passage means including a first plenum chamber communicating with said hollow leading edge portions for providing a first supply of cooling air thereto and a second plenum chamber communicating with said hollow trailing edge portions for providing a second supply of cooling air thereto independently of said first supply to said hollow leading edge portions.

12. The combination recited in claim 11, including variable valve means disposed in said air passage means and communicating with said second plenum chamber for varying the flow of cooling air into said second plenum chamber.

13. The combination recited in claim 12, in which said valve means is responsive to adjustment of said nozzle blade adjusting means in a direction increasing said flow path area to increase the flow of air into said second plenum chamber.

14. The combination recited in claim 13, and in which said turbine blades have internal passage means for flow of cooling air and in which said turbine blade passage means communicates with said second plenum chamber.

15. In a gas turbine power plant comprising in combination an outer housing; an air compressor positioned within said housing toward the upstream end thereof; annular wall members positioned within said housing and defining an annular combustion chamber having an annular entrance aperture downstream from said compressor and receiving air delivery therefrom; an annular duct wall positioned radially inward from said combustion chamber and defining with said housing an annular air duct surrounding said combustion chamber and receiving air delivery from said compressor; combustion apparatus positioned within said combustion chamber for delivering fuel thereto for combustion with said air; a turbine rotor positioned within said housing toward the downstream end thereof and drivably connected to said compressor and having a set of circumferentially-spaced turbine blades extending therefrom for co-action with combustion gases provided by said apparatus for driving said turbine rotor; the combination comprising: a turbine nozzle structure including a set of circumferentially-spaced and generally radially-disposed hollow nozzle blades for directing the combustion gases to said turbine blades; means for supporting said nozzle blades for pivotal adjustment about individual substantially radial axes for varying the effective area of the flow paths between said nozzle blades; said supporting means including a pair of radially-spaced inner and outer shroud rings between which said nozzle blades extend; each of said shroud rings having a spherical surface zone facing the respective end of each nozzle blade, said nozzle blades having at each end a spherical surface mating with said spherical shroud zones to permit pivotal blade adjustment with a minimum of clearance between said shroud rings and the adjacent blade ends; at least one of said shroud rings comprising a plurality of segments circumferentially disposed in end-to-end relationship with each segment being supported for radial movement; means for urging each of said shroud ring segments toward the adjacent end of the nozzle blade to minimize the clearance therebetween; each of said nozzle blades having a radially-extending trunnion at each end of said blade; the radially inner trunnions being tubular with the interior thereof communicating with the interior of said hollow nozzle blades; each of said shroud rings having individual bearing means for each of the nozzle blades within which the trunnions of said blades are pivotally journaled; each of said bearing means including a circular element movable in its supporting shroud ring to permit changes in the direction of the axis of its bearing; passage means receiving air from said air duct for channeling air to said sets of blades; and variable valve means disposed in said passage means, said valve means being responisve to adjustment of said nozzle structure in a direction increasing the area of said flow paths for increasing the flow of said cooling air to at least one of said sets of blades.

16. The combination recited in claim 15, including means for increasing the pressure of air from said air duct and for delivering said air at increased pressure to said nozzle blades.

17. The combination recited in claim 15, in which said air duct is a diffuser recovering substantially full pressure from said compressor.

18. A turbine nozzle structure for directing turbine motive fluid to the blades of a turbine rotor, said structure comprising in combination an inner shroud ring and an outer shroud ring, said rings being concentric about a longitudinal axis, a plurality of nozzle blades disposed between said rings and circumferentially spaced and having axes generally radial about said longitudinal axis, said nozzle blades providing paths therebetween for the turbine motive fluid, each of said nozzle blades having inner journal mounting means extending from the radially inner end thereof and journaled in said inner shroud ring, each of said nozzle blades having outer journal mounting means extending from the radially outer end thereof and journaled in said outer shroud ring, means for pivotally adjusting each of said nozzle blades about a radial axis for varying the effective area of each of said flow paths, each of said shroud rings having a spherical surface zone facing said nozzle blades, each of said nozzle blades having at each end a spherical surface mating with the adjacent shroud ring spherical zone to permit said pivotal blade adjustment with a minimum of clearance between said shroud rings and the adjacent blade ends, at least one of said shroud rings comprising a plurality of segments equal in number to the number of said nozzle blades and circumferentially disposed in end-to-end relationship with their edges meeting the edges of adjacent segments along lines substantially parallel to said longitudinal axis, each of said meeting lines being intersected by the radial axis of one of said nozzle blades, each of said segments being supported for radial movement, and means for urging each of said segments radially toward said nozzle blades.

19. The combination recited in claim 18, wherein each of said journal mounting means journaled in a segmented shroud ring has a first interlocking means, and the meeting edges of said segments journaling said mounting means have a second interlocking means mating with said first interlocking means, and wherein radial movement of said segments is transmitted through said first and second interlocking means to said journal mounting means.

20. The combination recited in claim 19, wherein said first interlocking means is a circular keyway, and said second interlocking means comprises a portion of a circular key projecting from each of said mating edges.

References Cited by the Examiner

UNITED STATES PATENTS

| | | |
|---|---|---|
| 2,651,496 | 9/1953 | Buckland et al. |
| 2,774,566 | 12/1956 | Richardson _____ 253—39.15 |
| 2,811,833 | 11/1957 | Broffitt _____ 60—39.66 |
| 2,851,216 | 9/1958 | Scanlan et al. _____ 253—39.15 |
| 2,869,821 | 1/1959 | Halford et al. _____ 253—78 |
| 2,950,084 | 8/1960 | Perry _____ 253—39 |
| 2,951,340 | 9/1960 | Howald _____ 60—39.66 |
| 2,972,441 | 2/1961 | Hall _____ 253—78 |

FOREIGN PATENTS

| | | |
|---|---|---|
| 1,151,368 | 8/1957 | France. |
| 618,493 | 2/1949 | Great Britain. |

MARK NEWMAN, *Primary Examiner.*

SAMUEL LEVINE, *Examiner.*